United States Patent
Sato

(10) Patent No.: US 6,545,217 B2
(45) Date of Patent: Apr. 8, 2003

(54) ELECTRICAL JUNCTION BOX HAVING DOUBLE-WALL STRUCTURE

(75) Inventor: Hidetoshi Sato, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/160,084

(22) Filed: Jun. 4, 2002

(65) Prior Publication Data

US 2003/0000720 A1 Jan. 2, 2003

(30) Foreign Application Priority Data

Jun. 12, 2001 (JP) .................................... 2001-177342

(51) Int. Cl.[7] .............................................. H02G 3/08
(52) U.S. Cl. ......................... 174/50; 174/58; 174/63; 174/64; 174/135; 220/4.02; 220/3.8; 439/535; 248/900
(58) Field of Search .............................. 174/50, 58, 63, 174/64, 135; 220/3.8, 3.2, 3.3, 4.02; 248/906; 439/535; 361/600

(56) References Cited

U.S. PATENT DOCUMENTS

| | | | | |
|---|---|---|---|---|
| 5,710,392 A | * | 1/1998 | Bordwell et al. | ............. 174/50 |
| 5,726,385 A | * | 3/1998 | Lowery et al. | ............. 174/50 |
| 6,291,767 B1 | * | 9/2001 | Beecher et al. | ............. 174/50 |
| 6,420,650 B2 | * | 7/2002 | Behr | ............. 174/50 |
| 6,443,322 B1 | * | 9/2002 | Braun et al. | ............. 220/4.02 |
| 6,467,640 B1 | * | 10/2002 | Hung | ............. 220/4.02 |
| 6,469,247 B1 | * | 10/2002 | Dodds et al. | ............. 174/50 |

FOREIGN PATENT DOCUMENTS

JP    8-288667    11/1996

* cited by examiner

Primary Examiner—Chau N. Nguyen
Assistant Examiner—Dhiru R Patel
(74) Attorney, Agent, or Firm—Armstrong, Westerman & Hattori, LLP

(57) ABSTRACT

An electrical junction box having a double-wall structure includes a container body and an upper cover to be mounted on the container body. A peripheral wall of the container body is composed of an outer wall and an inner wall. There is provided a horizontal rib between the outer wall and the inner wall for partitioning a space between the outer wall and the inner wall into an upper space and a lower space. A plurality of upper ribs and a plurality of lower ribs extending in a vertical direction are respectively provided at a determined interval above and below the horizontal rib. The horizontal rib is provided with communicating holes, between respective pairs of the upper ribs, which communicate the upper space with the lower space.

6 Claims, 1 Drawing Sheet

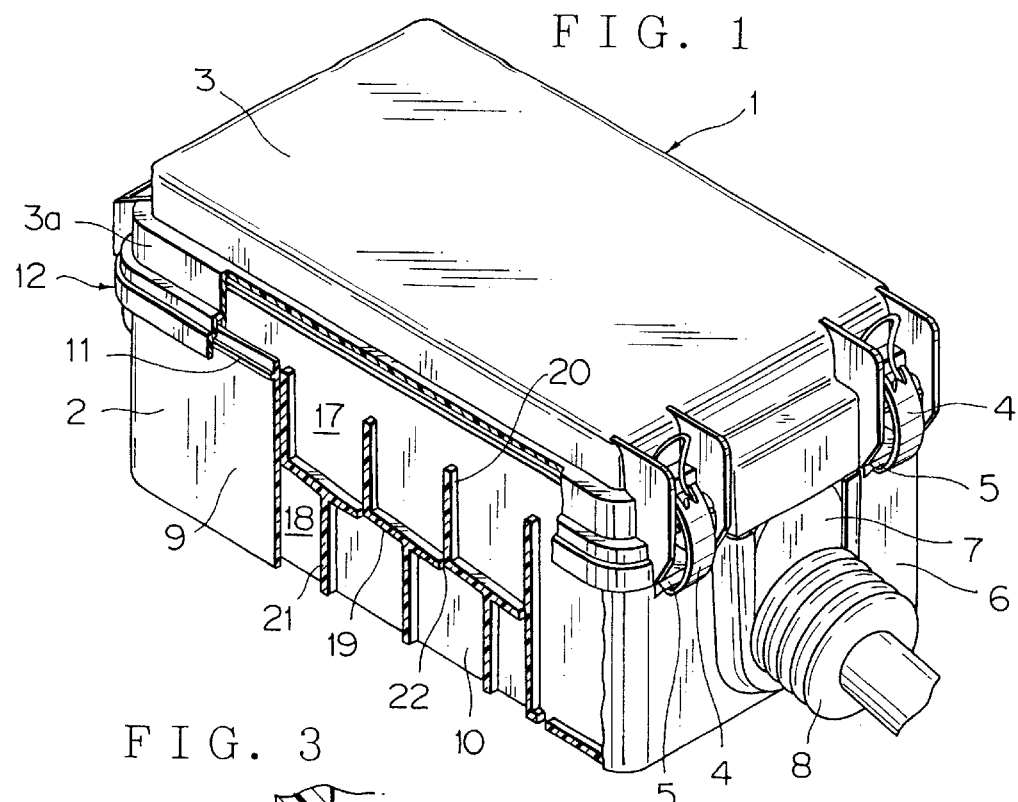
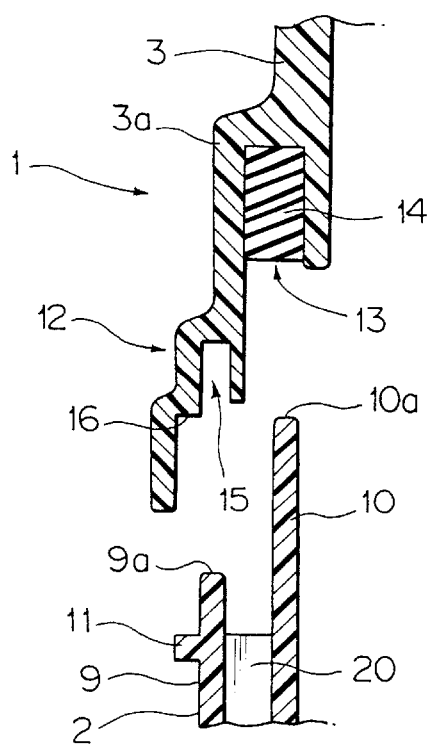
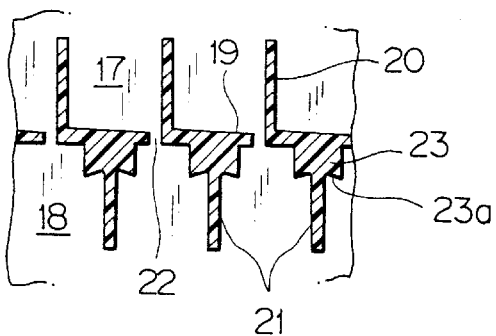

ELECTRICAL JUNCTION BOX HAVING DOUBLE-WALL STRUCTURE

BACKGROUND OF THE INVENTION

1. Field of the Invention

The present invention relates to an electrical junction box which is used for wiring arrangement in a motor vehicle or the like, and more particularly to the electrical junction box having a double-wall structure in which deformation of outer walls can be prevented and invasion of water can be restrained.

2. Description of the Related Art

There have been employed in motor vehicles electrical junction boxes such as a junction box, fuse box, relay box, etc. in order to contain various parts required for connecting and treating wire harnesses in the vehicle, and electrical components such as fuses, relays, electronic control unit, etc.

Various types of the electrical junction boxes have been employed according to types of the vehicles. For example, various types of electrical components are contained in a box-like case made of synthetic resin or the like, which is composed of a case body and an upper cover.

Because the electrical junction box is generally arranged at side areas in a lower part of a vehicle body, there is such anxiety that components such as circuits may cause a short circuit or a leaked current may flow, when water has intruded into an interior while driving in rain or at car wash. Therefore, it is necessary to render the electrical junction box waterproof. In case of washing a large car especially, high pressure water jetted with force is liable to intrude into the electrical junction box.

Specifically, the water which has collided against a side wall of the case body will sometimes flow along the side wall, enter between the side wall and the upper cover, and intrude into the case body. For this reason, it has been proposed that the side wall of the case body is formed to have a double-wall structure consisting of an outer wall and an inner wall. According to this structure, even though the water which has collided against the side wall has flowed along the side wall, and entered between the side wall and the upper cover, the water will intrude between the double walls, that is, between the outer wall and the inner wall. This water intruded between the double walls will lose force, and intrusion of the water into the case body can be restrained.

In the above described electrical junction box, the outer wall is held by the inner wall by means of some fixation members at several upper and lower positions between the outer wall and the inner wall, for example. However, since the high pressure water is splashed to the electrical junction box, the outer wall may sometimes be deformed because they are fixed only by means of such fixation means. Moreover, there is formed an opening in a lower part between the outer wall and the inner wall to drain water. When the high pressure water is splashed to this opening, the water may intrude from the opening into a gap between the outer wall and the inner wall, and may arrive at a position between the inner wall and the upper cover. In such cases, there is an anxiety that the water may intrude into the case body.

The present invention has been made in view of such circumstances, and an object of the invention is to provide an electrical junction box having a double-wall structure in which deformation of outer walls can be prevented and invasion of water can be restrained.

SUMMARY OF THE INVENTION

In order to attain the above described object, there is provided according to the present invention, an electrical junction box having a double-wall structure comprising a container body and an upper cover to be mounted on the container body, a peripheral wall of the container body including an outer wall and an inner wall, wherein a horizontal rib is provided between the outer wall and the inner wall for partitioning a space between the outer wall and the inner wall into an upper space and a lower space, a plurality of upper ribs and a plurality of lower ribs extending in a vertical direction are respectively provided at a determined interval above and below the horizontal rib, and the horizontal rib is provided with communicating holes, between respective pairs of the upper ribs, which communicate the upper space with the lower space.

With such a structure, the outer wall can be held without deformation, because the outer wall is supported by means of the horizontal rib and a plurality of the upper and lower ribs which are provided above and below the horizontal rib. Moreover, since the horizontal rib is formed between the outer wall and the inner wall, even though high pressurized water has entered into a gap between the outer wall and the inner wall through an opening between them, a large amount of the water will be blocked by the horizontal rib, and invasion of the water into the container body can be restrained.

It is preferable that the upper ribs and the lower ribs are provided substantially in a vertical direction.

This means that the container body, particularly the outer wall, the inner wall, the horizontal, the upper and the lower ribs can be integrally molded by injection molding, for example. Therefore, deformation of the outer wall can be reliably prevented, and a mass production can be attained easily, thus enhancing industrial values.

The horizontal rib is preferably arranged between the outer wall and the inner wall substantially in a middle part in a vertical direction, and each of the lower ribs is preferably arranged substantially in a middle part of a pair of the upper ribs in a horizontal direction.

In this manner, it will be possible to more reliably prevent deformation of the outer wall, because the horizontal rib is arranged substantially in the middle part between the outer wall and the inner wall, and each of the lower ribs is arranged substantially in the middle part between a pair of the upper ribs.

Each of the communicating holes is preferably arranged substantially in a middle part between a pair of the lower ribs.

Because each of the communicating holes is provided substantially in the middle part between a pair of the lower ribs, the water which has intruded from the opening formed in the lower part between the outer wall and the inner wall will collide against the lower ribs and flow along the lower ribs. Since the water will be blocked by the horizontal rib and will not easily intrude into the upper space through the communicating holes, invasion of the water into the container body can be more reliably prevented.

The lower rib is preferably formed in an inverted convex shape having a wider width in its upper part than in its lower part.

In this manner, even though the water flows along the lower ribs, the water will collide against the wider part, and so, invasion of the water into the upper space through the communicating holes will be all the more difficult.

Both lower end portions of the wider part are preferably tapered downwardly toward both ends.

In this manner, the water which has flowed along the lower rib and collided against the wider part will flow along the lower ends to be guided downwardly, and invasion of the water into the upper space through the communicating holes will be all the more difficult.

BRIEF DESCRIPTION OF THE DRAWINGS

FIG. 1 is a perspective view partly cut away showing an embodiment of an electrical junction box having a double-wall structure according to the present invention;

FIG. 2 is a sectional view showing arrangement of ribs according to the present invention; and FIG. 3 is a sectional view showing relation between an upper cover and a side wall of a case body according to the present invention.

DESCRIPTION OF THE PREFERRED EMBODIMENT

Now, an embodiment according to the present invention will be described in detail, referring to the drawings.

In FIG. 1, numeral 1 represents an electrical junction box, which contains parts required for connecting and treating wire harnesses in a vehicle, and electrical components such as fuses, relays, electronic control unit, etc.

The electrical junction box 1 which is composed of a case body 2 in a box-like shape and an upper cover 3 formed of synthetic resin, for example, is molded by injection molding or the like. The electrical junction box 1 is tightly sealed, by elastically engaging a locking hook 4 of the upper cover 3 with a locking claw 5 of the case body 2, after the upper cover 3 has covered an opening in an upper part of the case body 2.

There is formed, on one of side walls 6 of the case body 2, a mounting part 7 in a semi-circular shape for introducing electric wires such as the wire harness to be connected to the electrical components in the case body 2. A grommet 8 for protecting the wire harness is fitted to the mounting part 7.

A peripheral wall 6 of the case body 2 is formed in a double-wall structure consisting of an outer wall 9 and an inner wall 10 along its entire area except the mounting part 7. Specifically, as shown in FIGS. 1 and 3, the outer wall 9 is arranged outside the inner wall 10 at a determined distance so as to enclose the inner wall 10. Moreover, an upper end 10a of the inner wall 10 is made higher than an upper end 9a of the outer wall 9. A horizontally extending projection 11 is formed on an outer face of the outer wall 9 at an upper position along a substantially entire periphery thereof.

The upper cover 3 is a lid to be fitted to the opening of the container body 2, and provided with a peripheral wall 3a which surrounds an upper part of a peripheral wall of the container body 2. The peripheral wall 3a of the upper cover 3 is provided with an engaging part 12 with which the upper ends of the outer wall 9 and the inner wall 10 of the container body 2 are adapted to be engaged. The engaging part 12 includes a first groove 13 into which the upper end 10a of the inner wall 11 is inserted. A packing 14 made of rubber, for example, is provided in this first groove 13. Outside the first groove 13 and at a lower position than the first groove 13, there is formed a second groove 15 into which the upper end 9a of the outer wall 9 is inserted. An inner face of an outer wall 16 which defines this second groove 15 is formed in a step-like shape so as to be engaged with an outer face of the upper wall 9 having the projection 11. When the upper cover 3 is placed on the opening in the upper part of the container body 2, the outer face of the upper wall 9 comes into contact with the inner face 16 of the second groove 15, and at the same time, the upper end 9a of the outer wall 9 comes into contact with a bottom of the second groove 15. Simultaneously, the upper end 10a of the inner wall 10 is inserted into the first groove 13 pressing the packing 14, thereby to seal. The second groove 15 may be also provided with a packing made of rubber or the like.

Between the outer wall 9 and the inner wall 10 of the container body 2, there is formed a horizontal rib 19 which partitions a space between the outer wall 9 and the inner wall 10 into an upper space 17 and a lower space 18. There are further provided above and below the horizontal rib 19, upper ribs 20 and lower ribs 21, and the horizontal rib 19 is provided with communicating holes 22 for communicating the upper space 17 and the lower space 18.

Preferably, the horizontal rib 19 is extended in a horizontal direction. A shape of the horizontal rib 19 is not particularly limited, but may be in a form of rod having a rectangular cross section. The horizontal rib 19 is preferably arranged between the outer wall 9 and the inner wall 10 at a substantially middle position in a vertical direction. Near corner areas of the container body 2, the horizontal rib 19 may be provided in a lower part as shown in FIG. 1. This is because the corner areas are difficult to be deformed. However, it is apparent that in these areas too, the horizontal rib 19 may be arranged at a substantially middle position in a vertical direction between the outer wall 9 and the inner wall 10.

The upper rib 20 is preferably extended in a vertical direction. A shape of the upper rib 20 is not particularly limited, but may be in a form of rod having a rectangular cross section. A plurality of the upper ribs 20 are provided above the horizontal rib 19 at a determined interval. In other words, the upper space 17 is divided by the upper ribs 20 into a plurality of spaces. An interval between the upper ribs 20 can be optionally determined in such a range that the upper ribs 20 may not be deformed when high pressure water is jetted to the outer wall 9. Positions of upper ends of the upper ribs 20 are not particularly limited, but the upper ribs may be preferably extended up to positions above an area to which the high pressure water is directly jetted, for example, positions of the projection 11 or adjacent to the projection 11. By providing the upper ribs 20 in this manner, deformation of the outer wall 9 with the high pressure water will hardly occur when the upper cover 3 is mounted on the container body 2, because there are provided the upper ribs 20 inside the outer wall 9 to which the high pressure water is directly jetted.

The lower rib 21 is preferably extended in a vertical direction. A plurality of the lower ribs 21 are provided below the horizontal rib 19 at a determined interval. An interval between the lower ribs 21 can be optionally determined in such a range that the lower ribs 21 may not be deformed when high pressure water is jetted to the outer wall 9. Although not particularly limited, lower ends of the lower ribs 21 are preferably extended up to a bottom of the container body 2 between the outer wall 9 and the inner wall 10. Preferably, the upper ribs 20 and the lower ribs 21 are fixed to the horizontal rib 19 at different positions in a horizontal direction, and more preferably, each of the lower ribs 21 is positioned at a substantially middle part between a pair of the upper ribs 20.

A shape of the lower rib 21 is not particularly limited provided that it extends in a vertical direction. The lower rib 21 may be in a shape of rod in cross section, as shown in FIG. 1, and preferably, is in an inverted convex shape having a wider width in an upper part than in a lower part, as shown in FIG. 2. In case of forming it in the inverted convex shape, both lower end portions 23a of a wider part 23 are preferably tapered downwardly, or curved toward both ends. Two or more steps of the inverted convex shape may be formed in the lower rib 21.

The communicating holes 22 are provided so as to guide the water intruded into the upper space 17 to the lower space 18. One communicating hole 22 is provided between a pair of the upper ribs 20, and may be in any shape provided that the water can be guided therethrough.

Positions of the communicating holes 22 are not particularly limited, but they are preferably arranged at other positions than positions along rib faces of the lower ribs 21. More preferably, each of the communicating holes 22 is arranged in a substantially middle part between a pair of the lower ribs 21.

Moreover, an upper part of the horizontal rib 19 is preferably formed to have an inclined face which is inclined downwardly toward the communicating holes 22. By forming the inclined face in the upper part of the horizontal rib 19 in this manner, the water intruded into the upper space 17 can be smoothly guided to the lower space 18.

Then, operation will be described.

The upper cover 3 is mounted over the opening in the upper part of the container body 2, and locked to the container body 2 by elastically engaging the locking hooks 4 of the upper cover 3 with the locking claws 5 of the container body 2. On this occasion, the outer face in the upper part of the upper wall 9 comes into contact with the inner face 16 of the second groove 15, and at the same time, the upper end 9a of the outer wall 9 comes into contact with a bottom of the second groove 15. Simultaneously, the upper end 10a of the inner wall 10 is inserted into the first groove 13 pressing the packing 14 to be sealed, and accordingly, the upper cover 3 and the container body 2 are tightly sealed.

As described above, the upper wall 9 is in contact with the upper cover 3 in such a manner that the outer face in the upper part is abutted against the inner face 16 of the second groove 15, and at the same time, the upper end 9a is abutted against the bottom of the second groove 15. As the results, the upper part of the outer wall 9 will be prevented from being deformed, because the outer wall 9 is in face to face contact with the second groove 15, as compared with a case wherein the upper end 9a is abutted against only the bottom of the second groove 15.

When high pressure water is splashed to the outer wall 9 of this electrical junction box 1 at car wash or so, the water collided against the outer wall 9 will flow along the outer wall 9. The water flowing upward will strike the projection 11 and will scarcely flow between the outer wall 9 and the upper cover 3. In case where the water has flowed between the outer wall 9 and the upper cover 3, the water may sometimes intrude between the outer wall 9 and the inner wall 10. However, since the water will lose force (water pressure will drop) and will flow along the wall constituting the second groove, there is least water flowing upward between the outer wall 9 and the inner wall 10, because the water flowing from an interface between the outer wall 9 and the upper cover 3 into the gap between the outer wall 9 and the inner wall 10 flows in a downward direction. Consequently, the water will flow downward through the communicating holes 22 and will be discharged from the lower part between the outer wall 9 and the inner wall 10.

In addition, because the upper end 10a of the inner wall 10 is positioned higher than the upper end 9a of the outer wall 9, the water will be further prevented from flowing from between the inner wall 10 and the upper cover 3 into the container body 2.

Even when high pressure water is jetted to the outer wall 9, the outer wall 9 will not be deformed because the outer wall 9 is held by the inner wall 10 by means of the horizontal rib 19 and a plurality of the upper and the lower ribs 20, 21 which are provided above and below the horizontal rib 19. It will be possible to reliably prevent deformation of the outer wall 9 on this occasion, by arranging the upper and the lower ribs 20, 21 substantially in a vertical direction, and by arranging the upper and the lower ribs 20, 21 in staggered positions in a horizontal direction. It will be possible to more reliably prevent deformation of the outer wall 9, by arranging the horizontal rib 19 substantially in the middle part between the outer wall 9 and the inner wall 10, and each of the lower ribs is arranged substantially in the middle part between a pair of the upper ribs.

In case where high pressure water has entered into the gap between the outer wall 9 and the inner wall 10 through the opening between them, the water will flow upwardly along the lower ribs 21, the inner face of the outer wall, and the outer face of the inner wall. Then, a large amount of the water will be blocked by the horizontal rib 19, and invasion of the water into the container body can be restrained. In case where the water has intruded into the upper space 17 through the communicating holes 22, the water pressure will be decreased in the upper space 17, and the water will not flow into the container body 2 from the area between the inner wall 10 and the upper cover 3.

Moreover, the water which flows between the outer wall 9 and the inner wall 10 is not likely to flow in a substantially vertical direction, but deflected in either direction to be blocked by the lower ribs 21. Thus, most portion of the water will flow upwardly along the lower ribs 21. Because each of the communicating holes 22 is provided substantially in the middle part between a pair of the lower ribs 21, most portion of the water will be blocked by the horizontal rib 19, and will not easily intrude into the upper space 17 through the communicating holes 22. For this reason, invasion of the water into the container body 2 can be more reliably prevented.

By forming the lower rib 21 in an inverted convex shape having a wider width in an upper part than in a lower part, the water flowing along the lower rib 21 will strike the wider parts 23. Even though the water has flowed in a horizontal direction, the water will scarcely intrude into the upper space 17, because there is a distance from the communicating hole 22. Further, by tapering the lower end portions 23a of the wider part 23, the water which has struck the wider part 23 will be returned to the lower part. Consequently, invasion of the water into the upper space 17 will be all the more difficult.

As described, in the electrical junction box 1 according to the present invention, the outer wall 9 is held by the horizontal rib 19, the upper and the lower ribs 20, 21 which are provided on the outer face of the inner wall 10. Accordingly, when water has intruded from the lower part between the outer wall 9 and the inner wall 10, most portion of the water will be blocked by the horizontal rib 19, and discharged from the lower part between the outer wall 9 and the inner wall 10. Thus, deformation of the outer wall 9 can be prevented and, invasion of the water into the container body 2 can be prevented.

Still further, the upper and the lower ribs 20, 21 are arranged substantially in a vertical direction, and the horizontal rib 19 is preferably arranged substantially in a horizontal direction. This means that the container body 2 including the outer wall 9, the inner wall 10, the horizontal, the upper and the lower ribs 19, 20, 21 can be integrally molded by injection molding employing an upper and a lower molds, for example. Therefore, deformation of the outer wall can be reliably prevented, and a mass production can be attained easily, thus enhancing industrial values.

Although the present invention has been fully described by way of examples with reference to the accompanying drawings, it is to be noted that various changes and modifications can be made within a scope of the present invention.

What is claimed is:

1. An electrical junction box having a double-wall structure comprising a container body and an upper cover to be mounted on said container body, a peripheral wall of said container body including an outer wall and an inner wall, wherein a horizontal rib is provided between said outer wall and said inner wall for partitioning a space between said outer wall and said inner wall into an upper space and a lower space, a plurality of upper ribs and a plurality of lower ribs extending in a vertical direction are respectively provided at a determined interval above and below said horizontal rib, and said horizontal rib is provided with communicating holes, between a pair of said upper ribs, which communicate said upper space with said lower space.

2. The electrical junction box having the double-wall structure as claimed in claim 1, wherein said horizontal rib is arranged between said outer wall and said inner wall substantially in a middle part in a vertical direction, and each of said lower ribs is arranged substantially in a middle part of a pair of said upper ribs in a horizontal direction.

3. The electrical junction box having the double-wall structure as claimed in claim 1 or 2, wherein each of said communicating holes is arranged substantially in a middle part between a pair of said lower ribs.

4. The electrical junction box having the double-wall structure as claimed in claim 3, wherein said lower rib is formed in an inverted convex shape having a wider width in its upper part than in its lower part.

5. The electrical junction box having the double-wall structure as claimed in claim 2, wherein said lower rib is formed in an inverted convex shape having a wider width in its upper part than in its lower part.

6. The electrical junction box having the double-wall structure as claimed in claim 1, wherein said lower rib is formed in an inverted convex shape having a wider width in its upper part than in its lower part.

* * * * *